(12) United States Patent
McInerny et al.

(10) Patent No.: US 9,118,735 B1
(45) Date of Patent: Aug. 25, 2015

(54) FINDING PEOPLE USING SOCIAL NETWORKS

(71) Applicant: Amazon Technologies, Inc., Reno, NV (US)

(72) Inventors: Michael James McInerny, Seattle, WA (US); Phivos Costas Aristides, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 443 days.

(21) Appl. No.: 13/709,593

(22) Filed: Dec. 10, 2012

(51) Int. Cl.
*G06F 15/16* (2006.01)
*H04L 29/06* (2006.01)

(52) U.S. Cl.
CPC .................................... *H04L 65/403* (2013.01)

(58) Field of Classification Search
CPC .................................................... H04L 65/403
USPC ........................................................ 709/204
See application file for complete search history.

(56) References Cited

U.S. PATENT DOCUMENTS

2008/0270158 A1* 10/2008 Abhyanker ...................... 705/1
2010/0077484 A1* 3/2010 Paretti et al. ................... 726/26

* cited by examiner

*Primary Examiner* — Bryan Lee
(74) *Attorney, Agent, or Firm* — Baker & Hostetler LLP

(57) ABSTRACT

Embodiments are described for assisting a first person in finding a second person using a social network. A person may send a request to a server that identifies that person, the person he or she is looking for, and the requestor's location. The server may then traverse that person's social network to identify someone who is in a similar location and who knows the person being sought. The server may send an identification of this person who knows the person being sought to the requestor. Various privacy mechanisms are also disclosed, including anonymizing identifying information, and encrypting communications.

21 Claims, 8 Drawing Sheets

FINDING PEOPLE USING SOCIAL NETWORKS

BACKGROUND

A social network is a structure that represents people and relationships between those people. A social network for a given person may be thought of as that person, and those people to whom that person is connected via relationships. Two people may be directly connected where there is a relationship between those people (e.g., they know each other), and this may be thought of as those people having one degree of separation. Similarly, two people may be indirectly connected where they do not have a direct relationship, but do have a direct relationship with a common person (e.g., they both know the same person), and this may be thought of as those people having two degrees of separation. It may be appreciated that people may be even more tenuously connected in indirect relationships—e.g., three degrees of separation or more.

A social networking service, then, is a computer system that implements a social network across a computer network. For instance, people may log in to a social network service from their mobile device to access data stored on a social networking server—such as data that represents the social network connections that people have with each other. A person who uses a social networking service may add or delete connections or friends on that service, and communicate with those connections or friends by way of that service.

BRIEF DESCRIPTION OF THE DRAWINGS

Throughout the drawings, reference numbers may be re-used to indicate correspondence between referenced elements as between the various drawings. The drawings are provided to illustrate example embodiments described herein and are not intended to limit the scope of the disclosure.

DETAILED DESCRIPTION OF ILLUSTRATIVE EMBODIMENTS

Figure 1A:
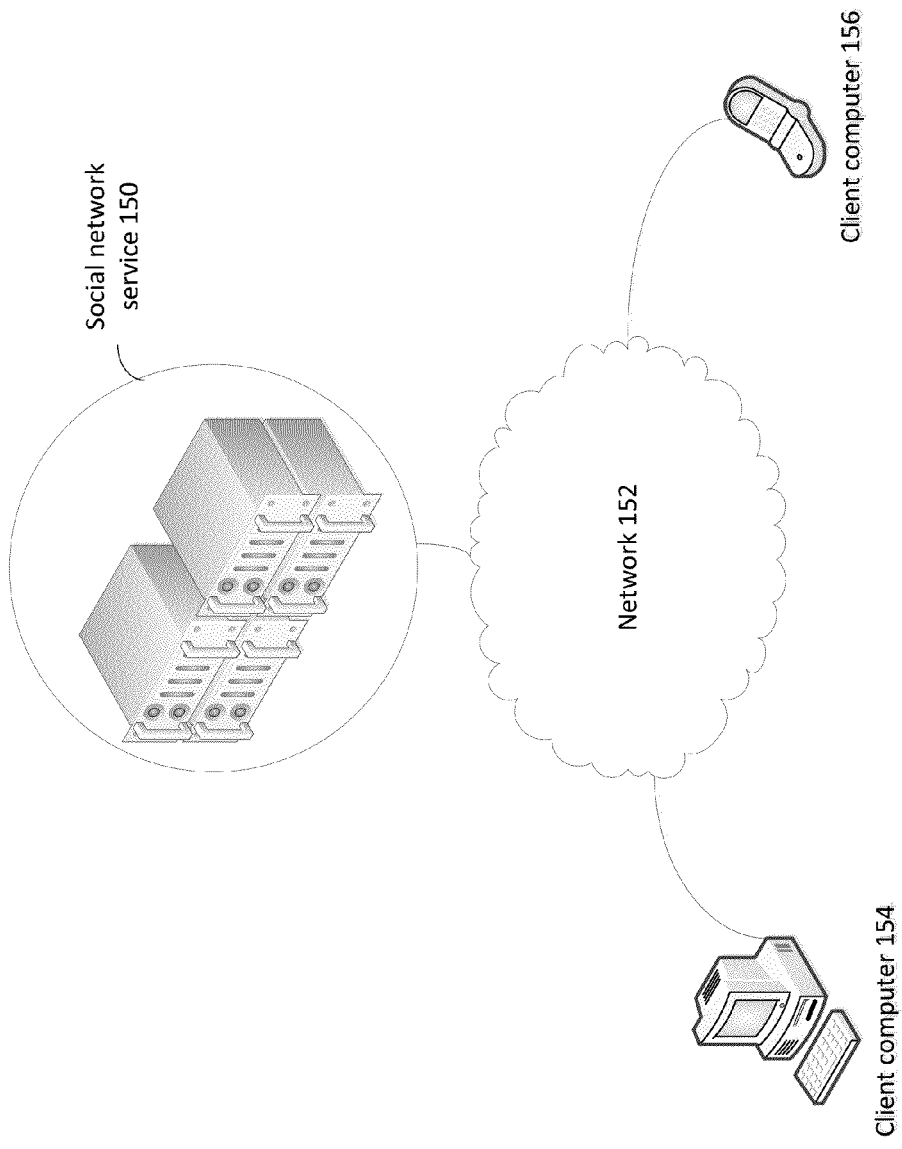
FIG. 1A is a diagram illustrating a social network service 150.

The following detailed description is directed to technologies for assisting a requesting person in finding a target person using a social network service. There are times when a person cannot communicate directly with another person in his or her social network. For instance, both people may be at a crowded event where cellular towers are at capacity, so phone calls cannot be made, but it is possible to transmit a small number of data packets. In another example, the person sought may not have access to a mobile device, or does have access to a mobile device, but the person seeking to contact him lacks his mobile number. In another example, a parent may register participation when he and his child arrive at a shopping mall. Then, should the child become lost, a form of an "Amber Alert" may be sent to friends, security, clerks, and shop owners in the mall regarding the child. It would therefore be an advantage to leverage pre-existing social network services to identify a person who may be able to tell the requesting person where the person sought is located. Aspects of the disclosure include various user authorizations (or opt-ins) to preserve user privacy.

Various aspects of the disclosure are now described with regard to certain examples and embodiments, which are intended to illustrate but not to limit the disclosure. It should be appreciated that the subject matter presented herein may be implemented as a computer process, a computer-controlled apparatus, a computing system, or an article of manufacture, such as a computer-readable storage medium and/or a non-transitory computer-readable medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special-purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. In these drawings, like numerals represent like elements.

FIG. 1A is a diagram illustrating a social network service 150. A social network service is an online service, platform, or site that focuses on facilitating the building of social networks or social relations among people who, for example, share interests, activities, backgrounds, or real-life connections. A social network service may also comprise other online sites where information about a user and his or her relation to other users may be stored, such as an ecommerce site where information about items a user has purchased and/or gifted to another user is stored.

Social network service 150 may be used to represent social network 100 of FIG. 1A. As depicted, social network service 150 comprises a plurality of computers. In embodiments, social networking service 150 may be made up of one computer. Social network service 150 may store a variety of information about users of the social network and their social relations and interactions. This data may include, for instance, whether two users are friends, whether a user has blocked another user, whether a user is online, links that a user has posted or shared with another user, a user's favorite things (such as books or movies), private messages sent between users, demographic information about a user (such as a birthday or hometown), photos that a user has uploaded, the identity of users in photos, relationships between family members, and invitations to events.

Users may then connect to social network service 150 across communications network 152 (such as the INTERNET). As depicted, client computer 154 and client computer 156 are configured to communicate with social network service 150 through network 152. Client computer 154 is depicted as a desktop computer, and client computer 156 is depicted as a mobile device. Users of these client computers 154-156 may then update their profiles, communicate with each other, or perform any of the other functions discussed above via social networks service 150.

Figure 1B:
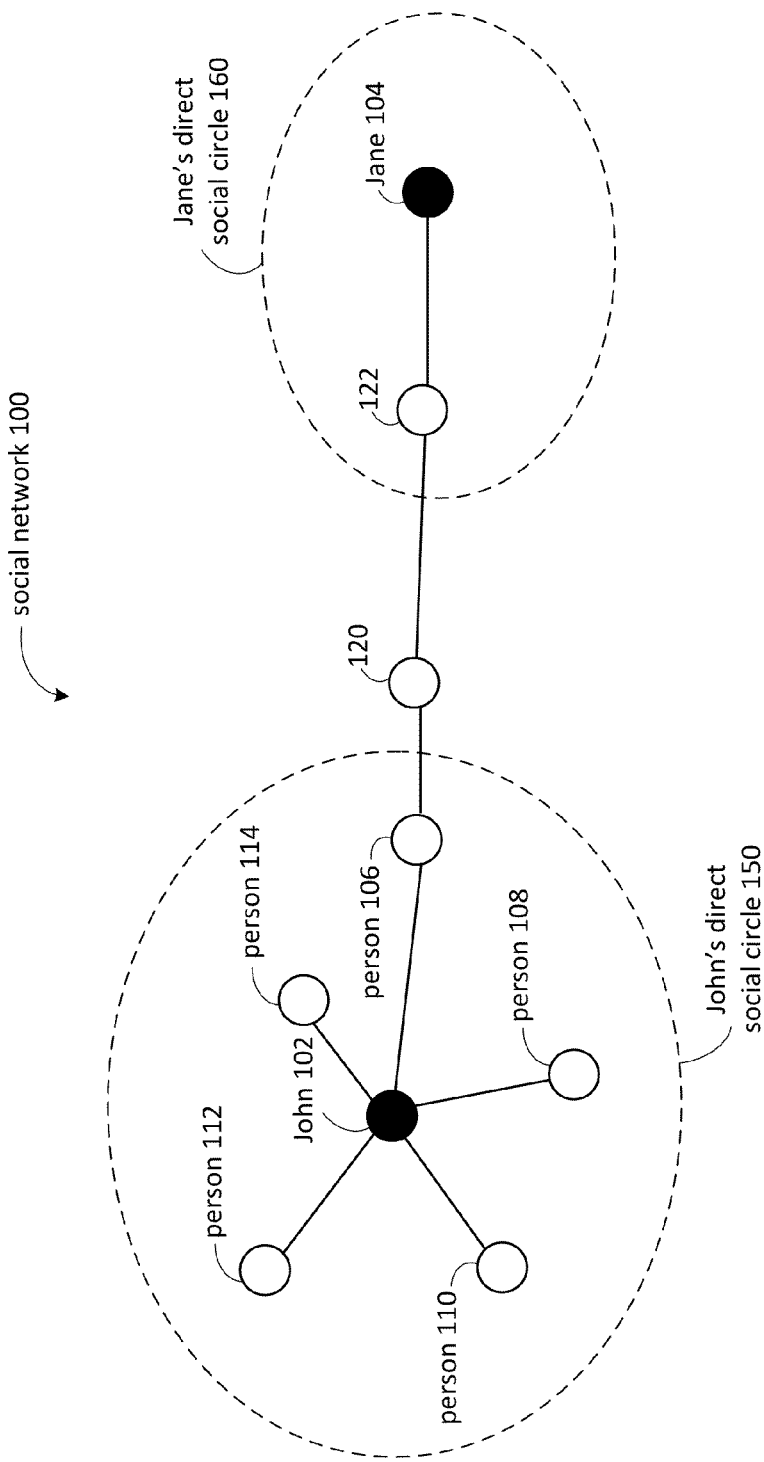
FIG. 1B is a diagram illustrating a social network that may be implemented in a social network service.

FIG. 1B is a diagram illustrating a social network 100. A representation of social network 100 may be stored social network service 150 of FIG. 1A. As depicted, social network 100 connects John 102 with Jane 104. John 102 is directly connected to five people—persons 106, 108, 110, 112, and 114. John may be considered to have one degree of separation from persons 106-114 because he is directly connected to them, and persons 106-114 may be considered to have two degrees of separation from each other because they are each connected through John. Similarly, people may be connected through three-or-more degrees of separation by having increasingly tenuous connections. John's direct social circle 150 is then John 102 and those persons 106-114 to whom John is directly connected. Jane 104 is not within John's direct social circle.

Jane 104's direct social circle 160 does not include John, but does include person 120. Despite not being directly connected, John 102 and Jane 104 are connected, because John 102 is connected with person 106 who shares a mutual contact 120 with a person with whom Jane is directly connected 122. Thus, a connection between John 102 and Jane 104 exists from John 102 to person 106 to 120 to 122 to Jane 104, and John 102 and Jane 104 are connected in this social network (via four degrees of separation).

Social network 100 may comprise multiple types of social network services. For instance, John 102 may be connected with person 106 because person 106 is in John 102's email address book. Then John 102 may be connected with person 108 in a different manner—such as if they are both friends on a social network service (e.g., the FACEBOOK or GOOGLE PLUS social network services). These multiple types of social network connections may make up a broader social network that may be used to implement aspects of the disclosure.

Figure 2:
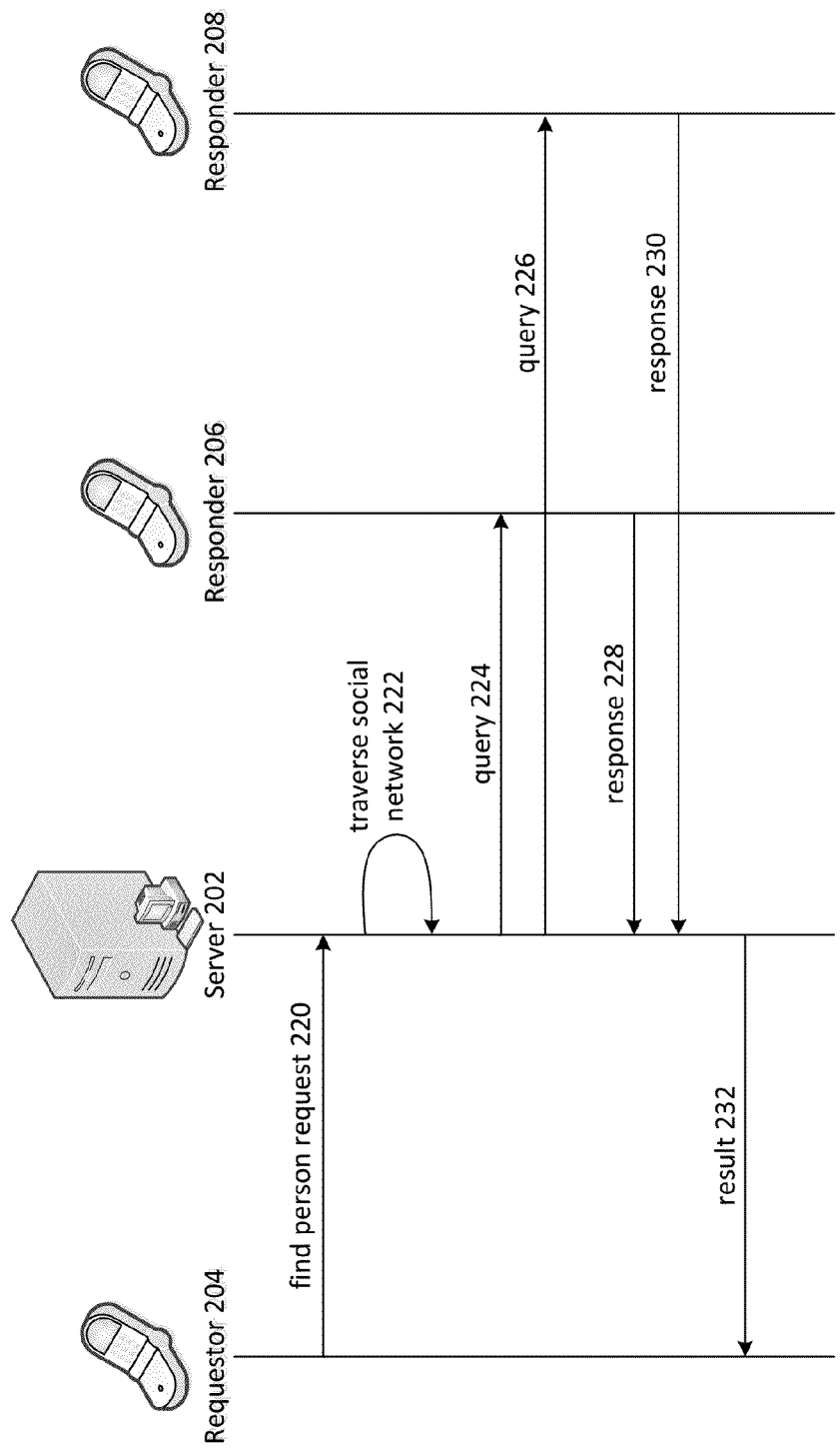
FIG. 2 illustrates an example communication flow for a server for assisting a requesting person in finding a target person using a social network service.

FIG. 2 illustrates an example communication flow for a server for assisting a requesting person in finding a target person using a social network service. There are embodiments of the disclosure where not all of the communications of FIG. 2 (or the communications of FIG. 3 or 7) are implemented, or where the communications are implemented in a different manner than depicted. The depicted communication flow is simplified to highlight aspects of the disclosure, and more complex communication flows may be built using similar principles as described here.

Figure 3:
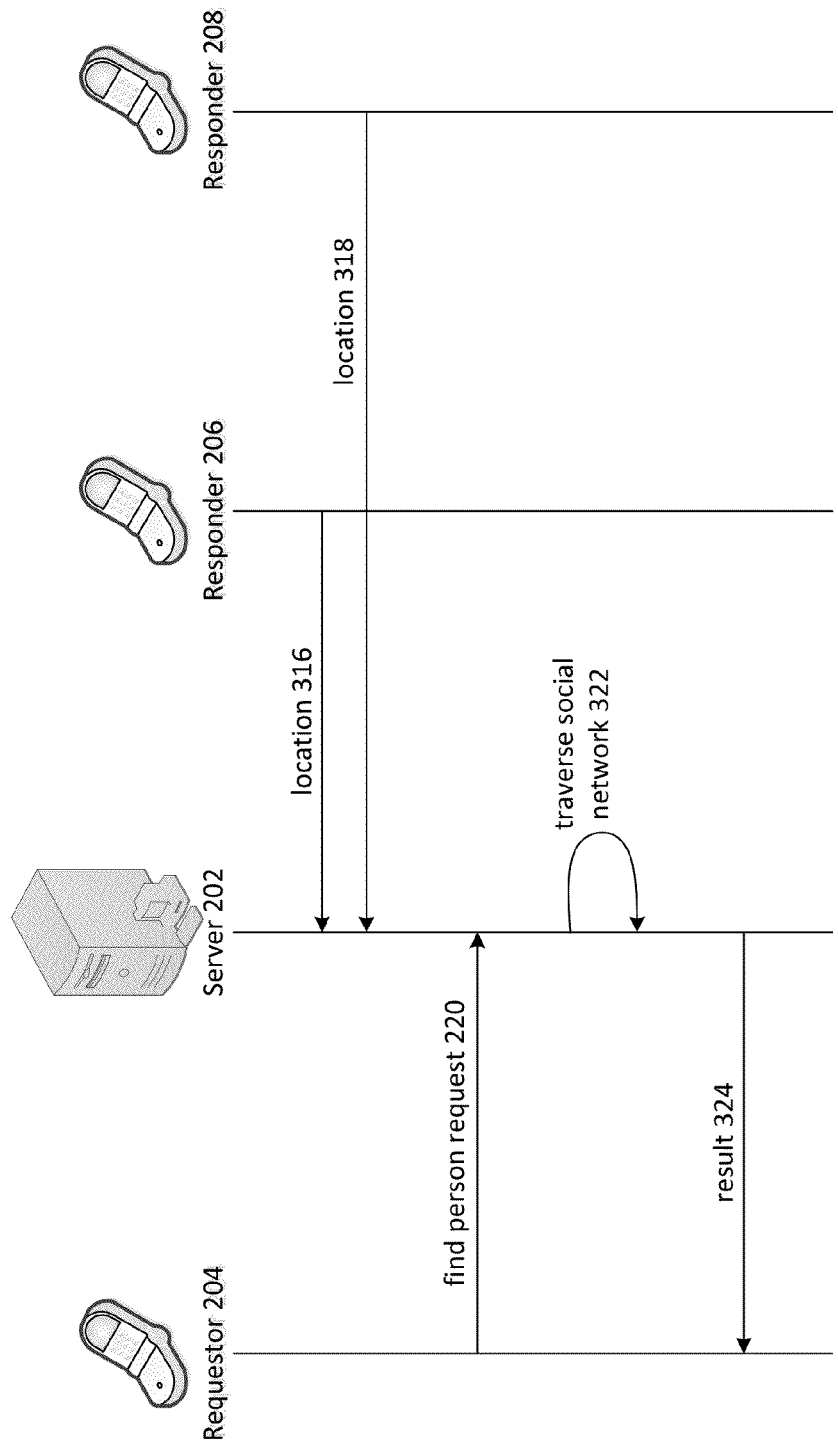
FIG. 3 illustrates a second example communication flow for a server for assisting a requesting person in finding a target person using a social network service.

The communication flow of FIG. 2 illustrates a server 202 communicating with three computers (e.g., mobile devices)—204, and responders 206 and 208. FIG. 2 illustrates embodiments where a requestor queries the server for assistance in finding a target person. The server receives responses about the location of the target person from one or more responders, and uses this information to provide a possible location for the target person to the requestor. In other embodiments (such as illustrated in FIG. 3), the server uses the requestor's location and social network to identify people who know the target person who are in a similar location as the requestor. The server may obtain approval from the responders to use their location and/or social network to find a person who is both near the requestor and who knows the target person. When the server finds a person who meets these criteria, the server may identify this person to the requestor. Then, the requestor may move around to find this person, and ask him or her where the target person is.

Referring to FIG. 2, the communications flow begins where requestor 204 sends a message 220 to server 202 that requests assistance in finding a target person. For example, requestor 204 may be John 102 and the target person may be Jane 104. Message 220 may identify requestor 204, and the target person, as well as a physical location of requestor 204. Location information for requestor 204 (and other entities) may be determined in a variety of manners: GPS (Global Positioning System) information for the requestor, a wireless access point that the requestor is connected to, a check-in at a location that the requestor has made, an image of a location where the requestor is located, information received from a server or computer that the user has uploaded location information to or that has otherwise identified location information, information received from a public calendar about the user's planned location at a particular time, or captured audio from a location that the requestor is located.

Server 202 may receive message 220, and in response, perform various operations. Server 202 may take requestor 204's identity, and from requestor 204's identity, determine a social network for requestor 204 (such as social network 100). Server 202 may then traverse this social network, using requestor 204 as a starting point, to find other people in the social network who may know where the target person is located. For instance, server 202 may find people in the social network who have a similar physical location as requestor 204. Where a person's location is not constantly updated, this location may be a last-known location (and where it is a last-known location, this information may be considered stale after the expiration of a predetermined amount of time, and the person is considered not to be at this last-known location any longer).

Having identified people in the social network who are likely to know the target person (e.g., because they are directly connected to the target person in the social network, such as how person 122 is directly connected to Jane 104 in social network 100), server 202 may then query responders 206-208 for information about the target person. This query may include, or be preceded by a request to these requestors 206-208 to have their location and/or social networks used in finding people, and/or to participate in this particular attempt to find a person. The query may include or be preceded by an opportunity to opt out of this particular attempt to find a person, or attempts to find people in general. Additionally, a responder may indicate whether a requestor may use his information based on how attenuated the relationship is between the requestor and the responder (e.g., the responder's information may be used to respond to the requests of only those people who are no more than two degrees of separation from the responder).

Server 202 sends query 224 to responder 206 and query 226 to responder 208. In response to receiving these queries, responders 206-208 may send responses 228 and 230, respectively to server 202. Each of responses 228-230 may identify a possible location of the target person. For instance, a responder may drop a pin on a map that indicates the last place he saw the target person, a responder click a button to assert that he just saw the target person, or has not seen the target person recently; or a responder may submit a written answer (e.g., "target person is probably on the third floor").

Where server 202 receives multiple responses, such as responses 228-230, server 202 may send all of the responses to requestor 204, or may synthesize the responses. For instance, where the responses all identify a different location on a map, server 202 may take an average of these multiple locations, and submit that to requestor 204. Server 202 may prioritize the responses, and send the response with the highest priority to requestor 204. For instance, server 202 may prioritize a response from someone with a lower degree of separation from the target person over a response from someone with a higher degree of separation from the target person. Where the responses come in multiple forms (e.g., one response is map coordinates, and another response is a written answer), server 202 may combine these disparate responses into a unified format (e.g., by converting each non-map-coordinates answer to a map-coordinates answer), and then synthesize the results in this unified format (e.g., by taking the average of these map coordinates).

Having processed responses 228-230, server 202 may then send a result 232 to client 204. This result may comprise, for example, the map coordinates indicated in each response, and/or a photo and/or name of the responder so that the requester may find that person and talk to him or her about where the target person may be. Server 202 may likewise send a photo and/or name of the requestor to each responder, so that the responders may know who is trying to find the target person, and talk to the requestor if the responder sees the requestor walking around.

FIG. 3 illustrates a second example communication flow for a server for assisting a requesting person in finding a target person using a social network service. The communication flow of FIG. 3 is similar to the communication flow of FIG. 2, and differs in the result that is returned to the user. Whereas FIG. 2 depicts embodiments where a server receives two responses from responders, and synthesizes these results to provide a result to a requestor, FIG. 3 depicts embodiments where the server may obtain approval from the responders to use their location and/or social network to find a person who is both near the requestor and who knows the target person.

As depicted, server 202 initially receives a communication 316 from responder 206 that identifies responder 206's location, as well as a similar communication 318 from responder 208. In embodiments, these communications may be sent at other times in the communication flow that precede result 324. In embodiments, communications 316-318 may be sent in response to a query from server 202 (such as queries 224-226 prompting responses 228-230 in FIG. 2).

Server 202 may traverse a social network for requestor 204. Server 202 may traverse this social network to find one or more responders 206-208 who are likely to know the target person, and who are in a similar physical location as requestor 204. Server 202 may then return a result 324 to requestor 204 that identifies these one or more responders 206-208. This result may, e.g., identify the responder by name, photo, relationship to the requestor (e.g., "Your friend Jim's friend Joseph"), relationship to the target person, and/or physical location. In embodiments, server 202 may send corresponding information to the responder, so that he or she knows who the requestor is that is looking for him or her.

Figure 4:
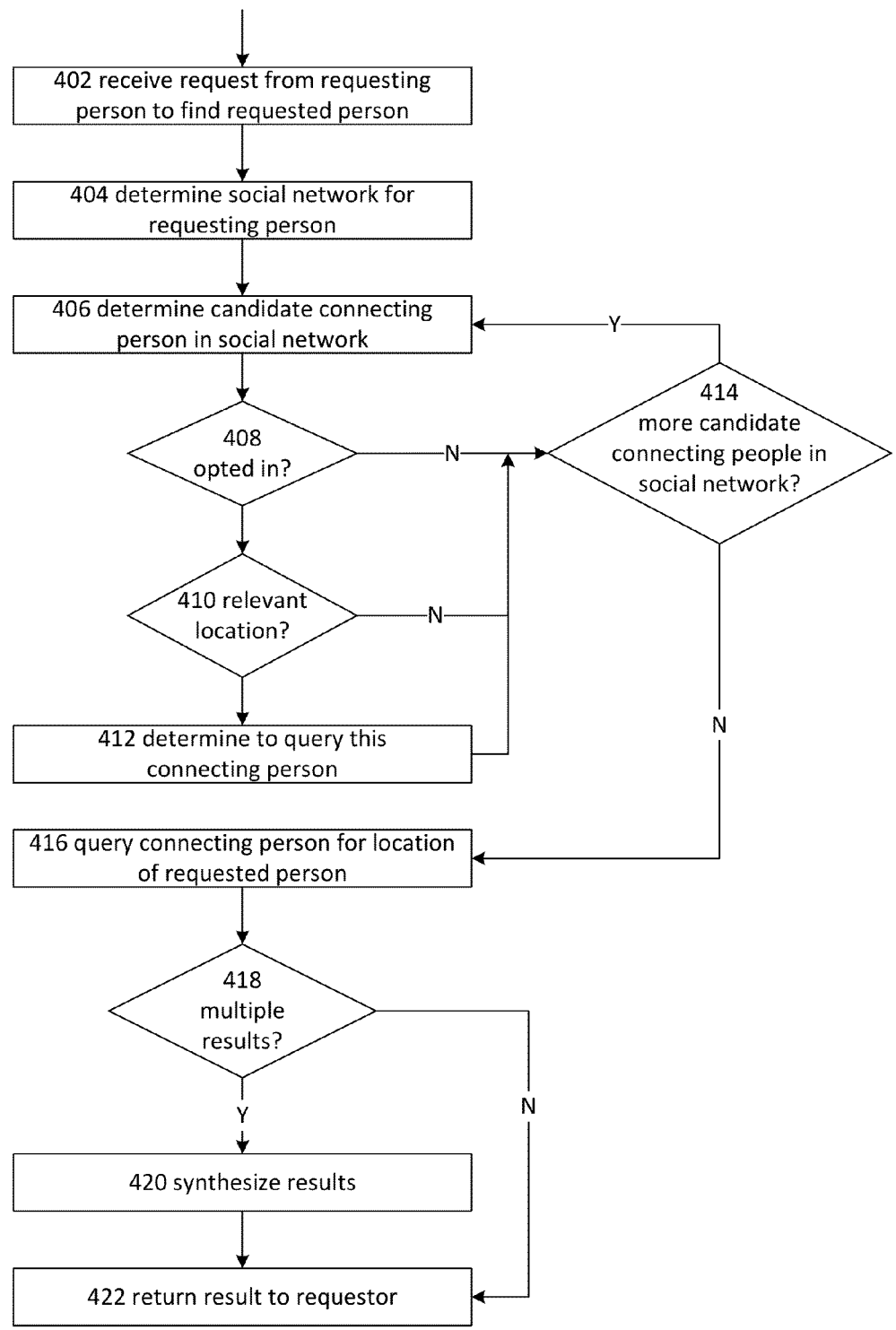
FIG. 4 illustrates example operating procedures for a server for assisting a requesting person in finding a target person using a social network service.

FIG. 4 illustrates example operating procedures for a server for assisting a requesting person in finding a target person using a social network. The operating procedures of FIG. 4 may be implemented by server 202 of FIG. 2 to effectuate assisting requestor 204 in finding a target person using a social network service that includes responders 206-208. In other embodiments, the operating procedures of FIG. 4 may be implemented in a computer system that is not a part of the social network service, but which is communicatively coupled to server 202. These operating procedures are described with reference to a requesting person, a target person, a first responding person, and a second responding person. These four people may be more generally referred to as a first person, a second person, a third person, and a fourth person, respectively.

The operating procedures of FIG. 4 begin with operation 402. Operation 402 depicts receiving a request from a requesting person to find a requested person. This request may be received by server 202 and from requestor 204. In embodiments, the request comprises an identification of the requesting person (such as a user ID), an identification of the requested person, and a location of the requesting person. In embodiments where the requesting person is using a kiosk to make the request (such as at all mall or a convention), the kiosk may have a pre-determined location (as opposed to, e.g., the GPS capabilities of some mobile devices), and the request may include this pre-determined location. For example, the request may identify which kiosk the request was made from, and server 202 may already have information about where that particular kiosk is located. After Operation 402, the operating procedures move to Operation 404.

Operation 404 depicts determining a social network for the requesting person. In embodiments, server 202 may maintain a social network for multiple people, and determine the requestor's social network based on the identification of the requesting person received in operation 402. In embodiments, the requesting person may send an indication of the social network to server 202. The social network may be made up of multiple different types of social network services (e.g., a social networking platform such as the FACEBOOK social networking platform, a list of people that the requestor has gifted items to on an e-commerce site, and the requestor's email address book). These different types of social network services may be combined to form one social network for the requestor. In embodiments, combining the multiple social networks may include identifying duplicate people. For instance, the requestor may have both gifted an item to a particular person, and have that person in his or her email address book. Where, the item gifting involved identifying the recipient's email address, this email address may be checked against the email address book to determine that one person is being separately identified in two different social network services. The two entries for that one person may then be combined in the social network.

Operation 406 depicts determining a candidate connecting person in the requestor's social network. In embodiments, a candidate person is a person who is likely to be part of a connection between the requesting person and the requested person. In embodiments, these candidate people may have some similarity with the requestor or target person—e.g., they all work for the same company or attended the same school. Embodiments may not traverse the entire social network where this requires a great deal of computational resources. Instead, heuristics may be applied to the social network to determine a subset of people in the network who are candidates—who are promising for connecting the requesting person and the requested person. That is, Operation 406 may involve traversing the social network of the requesting person, using the requesting person as the origin for traversing, and optionally pruning the social network while traversing, based on a location of people in the social network of the first person. Additionally, the traversing may be started from two spots in the social network—the requesting person and then also the target person. Each traversal may be conducted in parallel. The location of people may be determined in Operation 410.

In embodiments, people in the social network may be eliminated from candidacy as connecting people because, while they are in the requesting person's social network, the requesting person and this person have a negative affinity—they do not like each other. This may be determined through their interactions, or lack thereof. For instance, the two people may not ever communicate via the social network service, or when they do communicate, the content of those communications may be rude or hostile. After Operation 406, the operating procedures move to Operation 408.

Operation 408 depicts determining whether the candidate connecting person from Operation 406 has opted in to participating in assisting with finding people. This opting in may extend to this candidate connecting person opting in to sharing information about his or her identity, social network, and/or location. This opting in may take multiple forms. In embodiments, Operation 408 comprises a per-use opt-in—that opting in is made for this particular search. That is, Operation 410 may comprise determining that the connecting person has opted-in in response to sending the computer of the connecting user information identifying the requesting person, the target person, the location of the requesting person or a person in the social network of the requesting person that connects the requesting person and the connecting person.

In embodiments, the candidate connecting person and the requesting person have a number of degrees of separation. Operation 408 may comprise determining that the candidate connecting person has opted in to sharing information about his or her identity, social network, or location with people up to a given number of degrees of separation. For instance, where the candidate connecting person has opted in to sharing with people up to three degrees of separation, and the requestor and candidate connecting person have two degrees of separation, the number of allowed degrees of separation (three) is at least as many as the number of degrees of separation that exist between these two particular people. Additionally, the number of degrees of separation may depend on the type of relationship the two people have. For instance, a person may allow for a greater number of degrees of separation in social relationships than in professional relationships (e.g., the person will allow his information to be used in up to three degrees of separation in social relationships, but only two degrees of separation in professional relationships).

Where the candidate connecting person has not opted in, the operating procedures may move to operation 414, where it is determined if there are additional candidate connecting people in the social network of operation 404. Where the candidate connecting person has opted in, the operating procedures may move to operation 410, where the candidate connecting person may be considered further.

Operation 410 depicts determining if the candidate connecting person from Operation 406 has a location that is relevant to the current search. It may be that the requestor is trying to find connecting people who are at a given event or venue, because that's where the requestor is and where the requested person is supposed to be. Given that, Operation 410 may be used to identify only those candidate connecting people who have a last-known location within a predetermined distance from the location of the requesting person The last-known location of the candidate connecting person may be determined in a variety of ways. For instance, the last-known location may be determined based on a wireless network to which the computer of the candidate connecting person is connected, a geolocation provided by the computer of the candidate connecting person, a venue that the candidate connecting person has identified himself or herself as being at, or an event that the candidate connecting person has identified himself or herself as being at.

In embodiments, the last-known location information for a candidate connecting person may become stale. Where the location information represents a prior location rather than a current location, the candidate connecting person may have moved a great distance since that last-known location information was collected. In such cases, the last-known location information may be discarded if a time associated with it is older than a threshold amount of time. This candidate connecting person may then be treated as if he or she has no last-known location—such as by being removed as a candidate for connecting the requesting person and the requested person.

Where the candidate connecting person does not have a last-known location that is close enough to the requesting person, this candidate connecting person may be discarded for the purposes of this search. Where this candidate connecting person does have a last-known location that is close enough to the requesting person, this candidate connecting person may be identified as a person to query (Operation 412). Regardless of this result in operation 410, the operating procedures move to Operation 414 (though they may pass through Operation 412 on the way to Operation 414).

Operation 414 depicts determining if there are more candidate connecting people in the social network determined in Operation 404. If there is an additional candidate connecting person, the operating procedures return to Operation 408, where this candidate connecting person is analyzed to see if he or she is suitable to query in this search to find the requested person. If there is not an additional candidate connecting person, the operating procedures move to Operation 416.

Operation 416 depicts querying each connecting person for a location of the requested person. This operation deals with embodiments where there is at least one connecting person, as opposed to there being no connecting people. In embodiments, the query may have already been satisfied by the connecting person previously sending his or her last-known location. In such embodiments, the server may then use this information to identify to the requesting person a connecting person who knows the target person and who is near the requesting person.

In other embodiments, what is returned is not an identifier associated with the connecting person, but the connecting person's opinion of where the target person is. In such embodiments, the query may identify the requesting person and the target person and ask the connecting person to state where he or she believes the target person to be or last saw the target person. In embodiments where there is at least two degrees of separation between the requesting person and the connecting person (i.e., they are not directly connected in the social network), this query may also include an identification of the direct connect of the connecting person and an identification on how that person and the requesting person are connected. After Operation 416, the operating procedures move to Operation 418 where results of the query(s) are received.

In embodiments, a connecting person (via that person's computer) may not return information that the connecting person has because the target person has notified the connecting person that he or she does not wish to be located. This may be thought of as effectuating "do not disturb." For instance, when the target person is going to the library to have some interrupted study time, he or she may use a computer to identify this. This information may be sent to some or all people in his or her social network, or may be sent to a central server. Additionally, in embodiments where the connecting person's computer is able to communicate with the target person's computer, the connecting person's computer may query the target person's computer to determine whether it is alright to return a result before doing so.

Other factors may determine whether or not information about the target person is returned to a requestor. For instance, a familial relationship between the target person and the requestor may determine whether information about the target person is returned to a requestor. A minor child may set his mobile device to do not disturb, and this may be observed for all requestors, except where the requestor is his or her parent. In contrast, where the requestor is a parent, information about the target person may be sent to the requestor. A similar situation may occur where an employee is in a meeting. Information about the employee's location may be denied to all requestors, save for those requestors who are family members of the employee.

Other factors that may be used in determining whether or not information about the target person is returned to a requestor, such as making a determination of the target person's desire with respect to "do not disturb" based on implicit information. For instance, a target person may be determined to desire a "do not disturb" setting where his or her instant messaging status is set to away or busy, where a time in his or her calendar is busy, or where he or she has an automatic reply in an email program that says he or she is unavailable. These are not explicit indications of a "do not disturb" setting with regard to locating a target person, but may indicate the target person's desire to not be disturbed at the present time. A determination of whether or not information about the target person is returned to a requestor may also depend on the present circumstances. For instance, in an emergency situation, a "do not disturb" setting may be overridden, to provide a requestor with information about the target person.

Operation 418 depicts determining if multiple results have been received from querying each connecting person in Operation 416. This may involve determining if only one connecting person has been queried. In embodiments where multiple connecting people were queried in Operation 416, Operation 418 may include running a timer and accepting results only until a predetermined amount of time has run on the timer. After Operation 418, the operating procedures move to Operation 420.

Operation 420 depicts synthesizing the multiple results determined to have been received in operation 418. Where one or no results are received, Operation 420 may be skipped. Where multiple results are received, they may be prioritized, and only the result with the highest priority is sent to the requesting person. For instance, the highest priority may be determined based on which connecting person has the smallest degree of separation with the requesting person or the target person.

Rather than sending just one of the results, the results may be synthesized by being combined. For instance, where the results are map coordinates, an average of these coordinates may be returned. Alternatively, all of the map coordinates may be returned and displayed on one map. In embodiments, the format of these results may differ (e.g., one result is map coordinates, and another result is a written answer). In such embodiments, the results may be converted into a common format, then combined in this common format (e.g., all results may be converted to map coordinates and then combined).

In embodiments, the results are anonymized on the server to maintain privacy of those connecting people who participate. For example, something that identifies the common person's name or other person information may be tokenized, with the token giving no indication of who the common person is. Additionally, these results, as well as other communications, may be encrypted to increase privacy. For instance, encryption may be achieved through a public-key encryption scheme. In embodiments, the results may be encrypted such that only the server may decrypt the results, or only the requestor may decrypt the results. After Operation 420, the operating procedures move to Operation 422.

Operation 422 depicts returning a result to the requestor. Returning a result may comprise sending an identifier associated with the connecting person, a response based on a response from a computer of the connecting person, or a possible location of the target person to a computer of the requesting person. The result may also comprise a name, image, or location of the connecting person, a relationship between the requesting person and the connecting person, or a relationship between the target person and the connecting person. Given this information, the requesting person may either find the connecting person and speak to him or her, or go to the possible location of the target person and look for the target person there.

Figure 5:
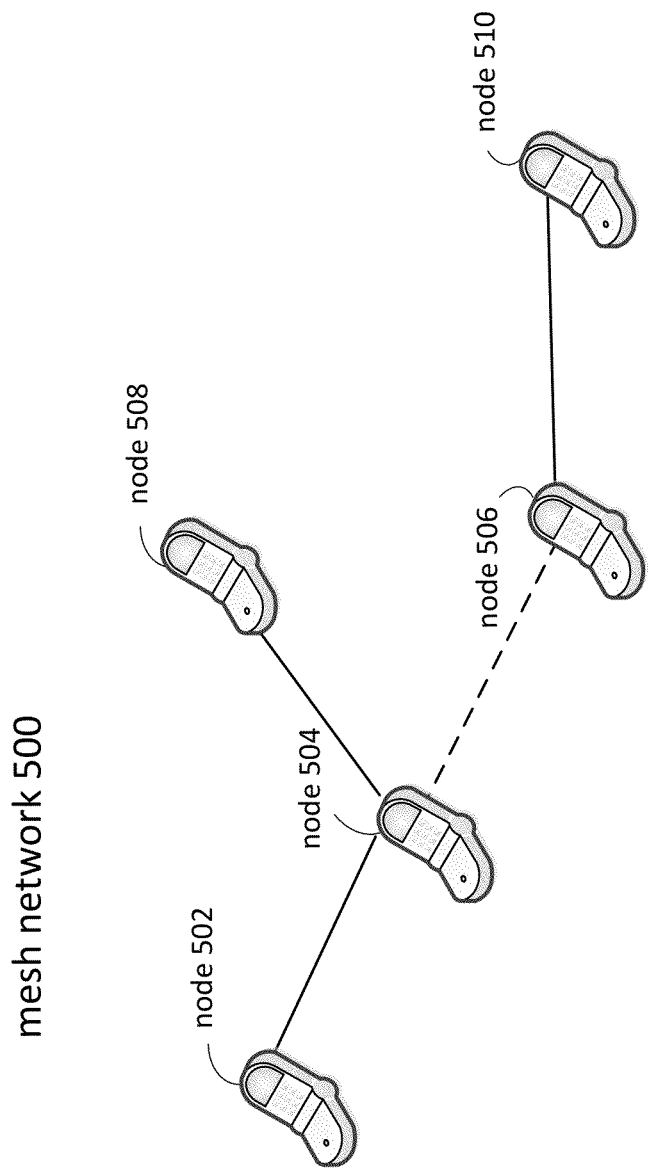
FIG. 5 illustrates an example communication flow for a mesh network for assisting a requesting person in finding a target person using a social network service.

FIG. 5 illustrates an example mesh network for assisting a requesting person in finding a target person using a social network. A mesh network is a type of decentralized network where each node (e.g., a computing device) is connected with one or more nodes, and where each node may serve as a conduit for communications between two nodes to which it is connected. As used herein, a mesh network is a network that lacks a centralized server, such as server 202 of FIG. 2, which serves as a central location where information is sent and stored (such as a social network being stored). The mesh network 500 of FIG. 5 shares many similarities with the central-server embodiments that are the primary point of FIGS. 2 and 4. A difference between mesh network 500 and server embodiments lies in these differences of system architecture. In a server embodiment, the server may have knowledge of the entire social network that connects the requesting person and the target person. In contrast, it may be that no single device in the mesh network has knowledge of the entire social network that connects the requesting person and the target person. For instance, each mesh device may have knowledge of only that part of the social network that its owner is directly connected to. Given these differences in where the social network is stored, a mesh network may traverse and prune from a social network in a different manner than occurs with a central server. That is, the mesh network may make more guesses as to connecting people whereas the central server may determine whether a person is a connecting person with certainty, given that it has a social network that connects the requesting person and the target person.

Mesh network 500 is depicted as having five nodes—nodes 502, 504, 506, 508, and 510. Node 502 represents the requesting person (e.g., John 102), and node 504 represents a connecting person or the target person (e.g., Jane 104). Node 502 may send a request to find the target person to node 504. Node 502 may communicate with node 504 because they are part of the same mesh network, and node 504 is associated with a person who is directly connected with the requesting person in the requesting person's social network. In turn, node 504 may communicate with nodes 506 and 508. Node 506 may have no additional nodes that it communicates with as part of the mesh network and where there is a direct social network connection between the operator of node 506 (aside from node 504—that connection having already been discussed) and the operator of another node.

While node 506 may not have additional nodes to communicate with as part of this search, node 508 may have a connection with node 510 and perform that communication, communicating the request to node 510. As depicted, node 510 may be controlled by a connecting person, who is either directly connected to the target person, or who has knowledge of a recent location of the target person. This information may be then passed back through nodes 508 and 504 to get to the requestor at node 502. In other embodiments, where node 510 and 502 are able to directly communicate (e.g., they are in close enough proximity), node 510 may communicate this information directly with node 502.

The dashed line between nodes 504 and 506 represents an operation of anonymization that occurs between these nodes. While the other inter-node communications may identify the other nodes that a given node is communicating with, in embodiments, node 506 does not identify to node 504 which other nodes it is communicating with, and node 504 does not identify to node 506 which other nodes it is communicating with. In this manner, a node may participate in the search while preserving privacy.

Figure 6:
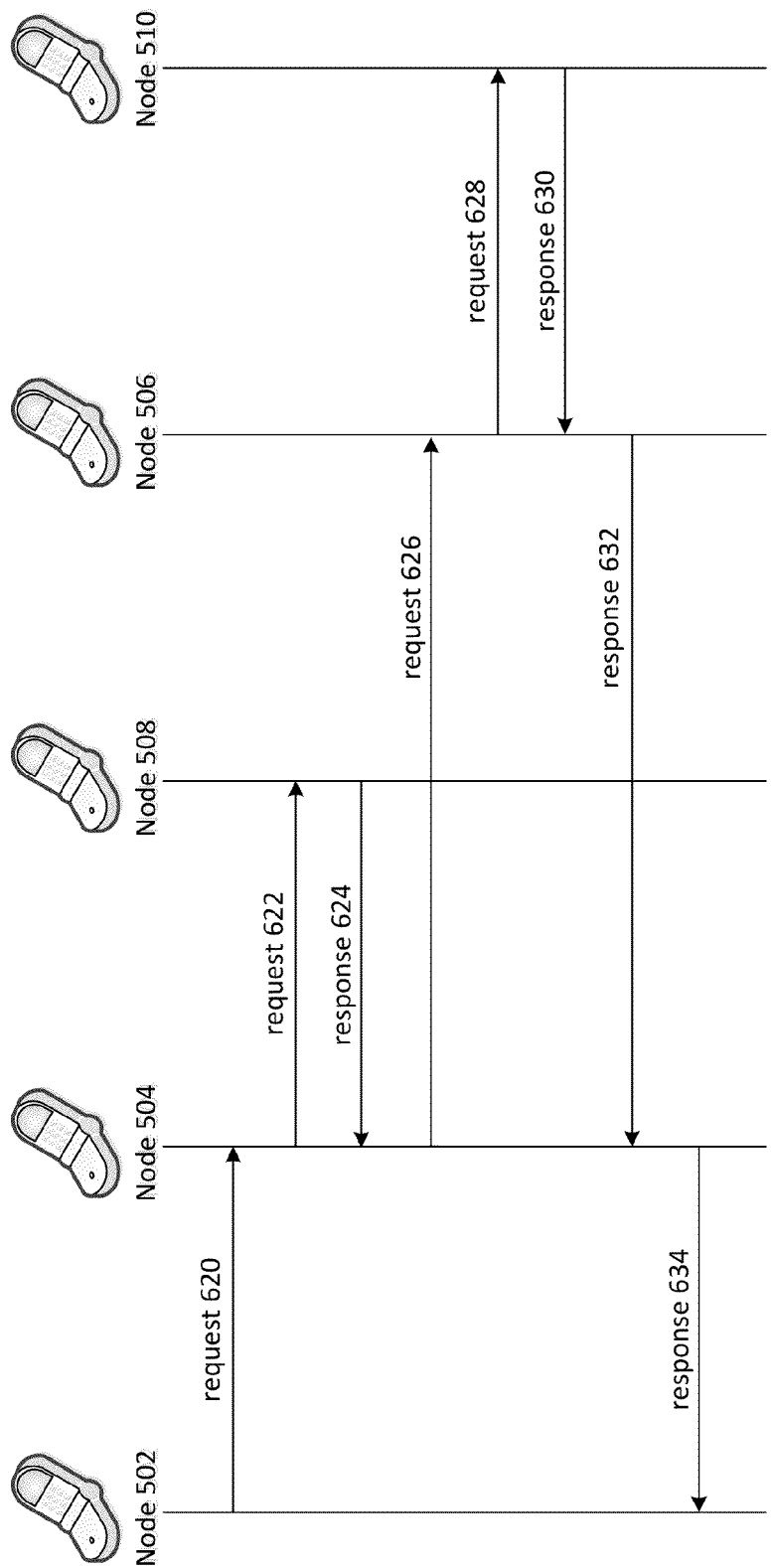
FIG. 6 illustrates example operating procedures for a mesh network for assisting a requesting person in finding a target person using a social network service.

FIG. 6 illustrates an example communication flow for a mesh network for assisting a requesting person in finding a target person using a social network. The communication flow of FIG. 6 begins with requestor 502 sending a request to node 504 that identifies a target person and the requestor him- or herself. Requestor 502 may send this request to node 504 because they are communicatively coupled in mesh network 500. In turn, node 504 may send a request to the two other nodes with which it is communicatively coupled in mesh network 500—nodes 506 and 508. Node 508 receives request 622 and responds with response 624, which indicates that node 508 is a "dead end"—node 508 has no response for a possible location of the target person or someone who knows the target person, and/or node 508 is not in communication with any other nodes to which it may forward the request.

Node 506 receives request 626 and is in communication with another node—node 510. So, node 506 forwards request 628 to node 510. Request 628 may be similar to request 620 or request 626. Request 628 may additionally include an indication that the request is being made on another's behalf—that node 506 itself is not the node that originated the search for the target person. In embodiments, node 506 may anonymize this information about who it received the request from, by not indicating that to node 510, or by indicating only that it is being made on behalf of another (such as "this request is being made on behalf of a friend of a friend, whom you are not directly connected to").

As depicted, node 510 either has (1) information about the target person or someone who knows the target person; or (2) has no such information and no further nodes to contact. Node 510 returns an indication of this in response 630 to node 506. In turn, node 506 returns response 632 to node 504, and node 504 returns response 634 to node 502—the original requestor. Node 502 may ultimately receive an indication similar to that described in FIG. 2 or 3 (in results 232 and 324, respectively).

Figure 7:
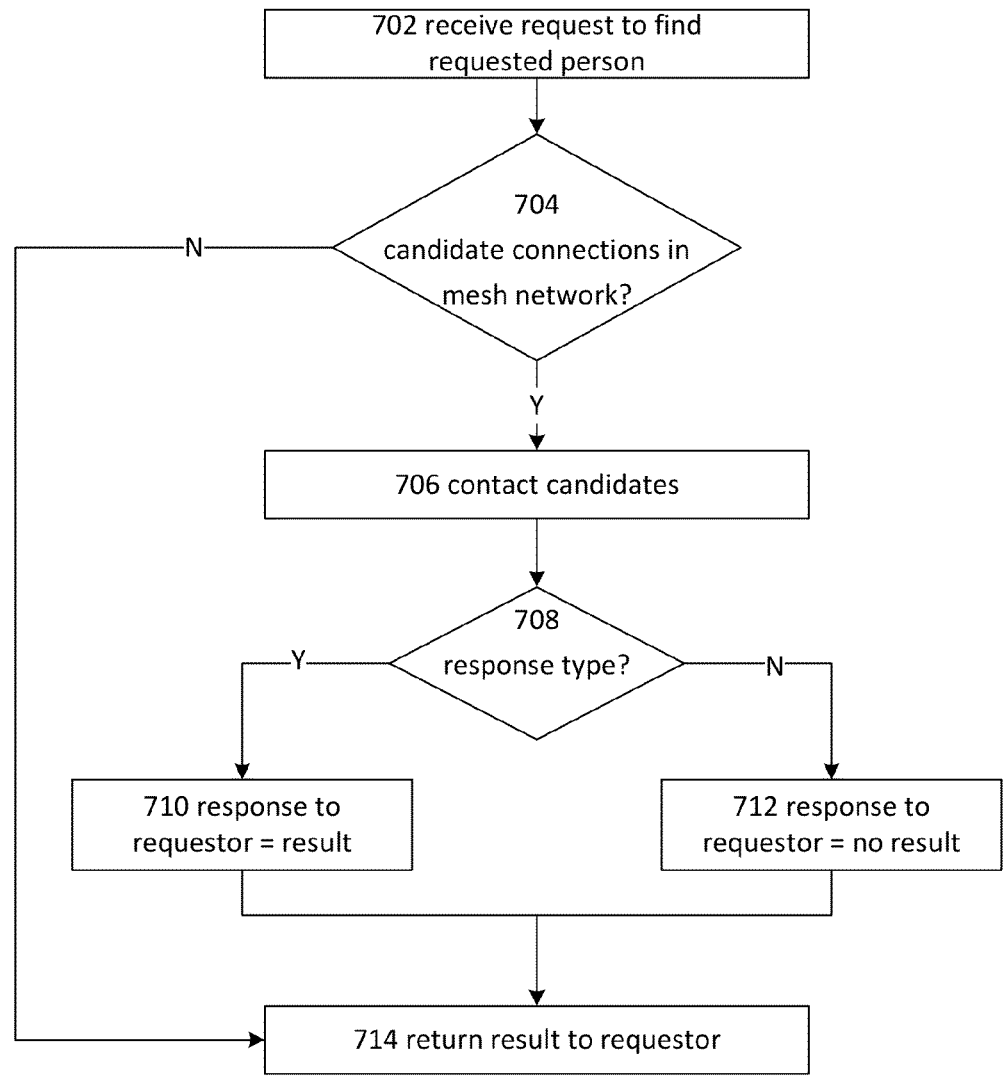
FIG. 7 illustrates an example mesh network for assisting a requesting person in finding a target person using a social network service where anonymization occurs.

FIG. 7 illustrates example operating procedures for a mesh network for assisting a requesting person in finding a target person using a social network. The operating procedures of FIG. 7 may be implemented in, for example, nodes 504-510 of FIG. 5 to effectuate the communications flow of FIG. 6.

The operating procedures of FIG. 7 begin with operation 702, which depicts receiving request to find requested person. This operation may comprise, for example, request 620 of FIG. 6, sent from node 502 (the requestor) and sent to node 504. This request may identify, for example, the person making the request, the requested person, and a geographical area where the person making the request is, or where the requested person may be.

Operation 704 depicts determining whether there are any candidate connections in mesh network. A candidate connection may be a node with which the node implementing these operating procedures is connected, that is not the node that this node received the request from (e.g., node 502 where node 504 is implementing these operating procedures, since node 504 receives request 620 from node 502). Additionally, it may be that nodes may opt out of participating in a request or otherwise be ineligible, even though they are connected with the current node. As depicted in FIG. 5, the candidate connections for node 504 are found in nodes 506 and 508.

Operation 706 depicts contacting one or more candidate connections determined in operation 704. This may comprise, as depicted in FIG. 6, node 504 sending request 622 to node 508, and sending request 626 to node 506.

Operation 708 depicts determining the type of a response that was received from a candidate connection. A response may be, for example that the responding node has no result (e.g., response 624 in FIG. 6), or an identification of where the target person is, or a person who may know where the target person is (e.g., response 632 in FIG. 6).

Operation 710 depicts determining that the response was a result. Where the response is a substantive result, this result may be returned to the requestor. Where multiple responses were received, these multiple responses may be synthesized and the synthesized result sent to the requestor, or the multiple responses may be sent to the requestor.

Operation 712 depicts determining that the response in operation 708 was no result. Where the response is no result, the node implementing these operating procedures may determine that that branch of request is fruitless, and that the node no longer needs to wait on a response before sending a response based on the results discussed in operation 710 to the requestor.

Operation 714 depicts returning the result to the requestor. This may involve, e.g., node 504 sending response 634 to node 502.

In addition to these techniques for locating a target person, these techniques may be leveraged for facilitating payments. For instance, a peer-to-peer payment system may be established where a chain of trust built on relationships in a social network is used to establish a trust relationship between two people who are not directly connected in a social network. For instance, the two people engaging in a financial transaction (such as one person making a payment to another) may have two degrees of separation, being connected by a connecting person. Each person in the transaction may use their computers to establish that they sufficiently trust the connecting person to use the connecting person to use that connecting person as a basis for trusting the other person in the financial transaction. Where the two parties to the transaction have a more attenuated relationship (e.g., have three or more degrees of separation), similar operations may be used for each of the connecting users. It may be that a person identifies through his computer that he will only trust connections with a maximum number of degrees of separation for financial transactions (e.g., no more than two degrees of separation), or that there is a different maximum number of degrees of separation allowed based on the amount of money being transferred (e.g., up to four degrees of separation is allowed for transactions below $100, but only up to two degrees of separation is allowed for transactions over $100).

While the present disclosure has been made in connection with preferred embodiments, as illustrated in the various figures, it is understood that other similar aspects may be used or modifications and additions may be made to the described aspects for performing the same function of the present disclosure without deviating there from. Therefore, the present disclosure should not be limited to any single aspect, but rather construed in breadth and scope in accordance with the appended claims. For example, the various procedures described herein may be implemented with hardware or software, or a combination of both. Aspects of the disclosure may be implemented with computer-readable storage media, which do not include signals, and/or computer-readable communication media. Thus, the invention, or certain aspects or portions thereof, may take the form of program code (i.e., instructions) embodied in tangible, or non-transitory, media, such as floppy diskettes, CD-ROMs, hard drives, or any other machine-readable storage medium. Likewise, certain aspects or portions of the disclosure may be embodied in propagated signals, or any other machine-readable communications medium. Where the program code is loaded into and executed by a machine, such as a computer, the machine becomes an apparatus configured for practicing the disclosed embodiments. In addition to the specific implementations explicitly set forth herein, other aspects and implementations will be apparent to those skilled in the art from consideration of the specification disclosed herein. It is intended that the specification and illustrated implementations be considered as examples only, and not considered as encompassing all aspects of the disclosure.

What is claimed is:

1. A system for assisting a requesting person in finding a target person using social networks, comprising:
    a memory bearing instructions that, upon execution by a processor, cause the system to at least:
    receive an identification associated with the requesting person, an identification associated with the target person, and a location of the requesting person;
    determine a social network of the requesting person based on the identification of the requesting person, the social network comprising information from at least one social network service;
    determine an identifier associated with a connecting person in the social network of the requesting person who is likely to connect the social network of the requesting person with a social network of the target person, and who has a last-known location within a predetermined distance from the location of the requesting person, wherein the requesting person and connecting person have a number of degrees of separation and a type of relationship;
    determine that the connecting person has opted-in to sharing information about his or her identity, social network, or location with people of at least as many degrees of separation as the number of degrees of separation for the type of relationship that the requesting person and connecting person have; and
    send an identifier associated with the connecting person, or a response based on a response from a computer of the connecting person, or a possible location of the target person to a computer of the requesting person.

2. The system of claim 1, wherein the instructions that, upon execution by the processor cause the system to at least determine that the connecting person has opted-in further cause the system to at least:
    determine that the connecting person has opted-in in response to sending the computer of the connecting person information identifying the requesting person, the target person, the location of the requesting person or a person in the social network of the requesting person that connects the requesting person and the connecting person.

3. The system of claim 1, wherein the memory further bears instructions that, upon execution by the processor, cause the system to at least:
    determine an identifier associated with a second connecting person; and
    wherein the processor-executable instructions that, when executed on the processor cause the system to at least send the response based on the response from the computer of the connecting person further cause the system to at least:
    send the response based on the response from the computer of the connecting person based on determining that the response from the computer of the connecting person has a higher priority than a response from a computer of the second person.

4. A method for assisting a first user in finding a second user using a social network, comprising:
    determining a social network of a first user;
    determining an identifier associated with a third user in the social network of the first user, the third user being a user that is likely to connect the social network of the first user with a social network of the second user, and who has a last-known location within a predetermined distance from the location of the first user, wherein the first user and third user have a number of degrees of separation and a type of relationship;
    determine that the third user has opted-in to sharing information about his or her identity, social network, or location with users of at least as many degrees of separation as the number of degrees of separation for the type of relationship that the first user and third user have; and
    sending an identifier associated with the third user, or a response based on a response from a computer of the third user, or a possible location of the second user to a computer of the first user.

5. The method of claim 4, further comprising:
    determining an identifier associated with a fourth user that is likely to connect the social network of the first user with the social network of the second user; and
    wherein sending the response based on the response from a computer of the third user comprises:
    sending the response based on a combination of the response from the computer of the third user and a response from a computer of the fourth user.

6. The method of claim 5, wherein a format of the response from the computer of the connecting person differs from a format of the response from the computer of the second connecting person, and wherein sending the response based on a combination of the response from the computer of the third user and a response from a computer of the fourth user comprises:
    converting the response from the computer of the third user and the response from the computer of the fourth user to a common format; and combining the response from the computer of the third user and the response from the computer of the fourth user while in the common format.

7. The method of claim 4, wherein determining the third user who has the last-known location within the predetermined distance from the location of the first user comprises:
determining the last-known location of the third user based on a wireless network to which the computer of the third user is connected, a geolocation provided by the computer of the third user, a venue that the third user has identified himself or herself as being at, or an event that the third user has identified himself or herself as being at.

8. The method of claim 4, further comprising:
receiving an identifier associated with the first user, an identifier associated with the second user, and a location of the first user.

9. The method of claim 8, wherein the location of the first user is a geographic location.

10. The method of claim 8, wherein determining the social network of the first user comprises:
determining the social network of the first user based on the identifier associated with the first user.

11. The method of claim 4, wherein determining the social network of the first user comprises:
determining the social network based on combining a first social network and a second social network of the first user, the first social network being a different type of social network than the second social network.

12. The method of claim 4, wherein determining the third user comprises:
traversing the social network of the first user, using the first user as a first origin for traversing and using the second user as a second origin for traversing.

13. The method of claim 12, wherein traversing the social network of the first user comprises:
pruning the social network while traversing, based on a location of people in the social network of the first user.

14. The method of claim 4, further comprising:
anonymizing results based on replacing an identifier associated with the second user with a token, and encrypting the anonymized results.

15. The method of claim 4, further comprising:
determining not to return an identifier associated with a fourth user based on determining that the first user and the fourth user have a negative affinity.

16. A non-transitory computer-readable storage medium for assisting a first user in finding a second user using a social network, bearing computer-executable instructions that, when executed on a computer, cause the computer to perform operations comprising:
receiving an identification associated with the first user, an identification associated with the second user, and a location of the first user;
determining a social network of the first user based on the identification associated with the first user;
determining a third user in the social network of the first user who is likely to connect the social network of the first user with a social network of the third user, and who has a last-known location within a predetermined distance from the location of the first user, wherein the first user and third user have a number of degrees of separation and a type of relationship;
determine that the third user has opted-in to sharing information about his or her identity, social network, or location with users of at least as many degrees of separation as the number of degrees of separation for the type of relationship that the first user and third user have; and
sending an identifier associated with the third user, or a response based on a response from a computer of the third user, or a possible location of the second user to a computer of the first user.

17. The computer-readable storage medium of claim 16, wherein determining the third user who has the last-known location within a predetermined distance from the location of the first user comprises:
determining that the last-known location of the third user and the location of the first user are a same event or venue.

18. The computer-readable storage medium of claim 16, further bearing computer-executable instructions that, when executed on the computer, cause the computer to perform operations comprising:
determining to withhold sending an identifier associated with a fourth user or a response based on a response from a computer of the fourth user to the computer of the first user in response to determining that a time associated with a last-known location of the fourth user is older than a threshold amount of time.

19. The computer-readable storage medium of claim 16, wherein receiving the location of the first user comprises:
receiving the identifier associated with the first user at a kiosk having a pre-determined location.

20. The computer-readable storage medium of claim 16, wherein the third user has at least two degrees of separation from the first user with a fourth user connecting the first and third users, and wherein determining the third user comprises:
sending the third user an indication that the fourth user is requesting information on another user's behalf.

21. The computer-readable storage medium of claim 16, wherein the identifier associated with the third user comprises a name, image, or location of the third user, a relationship between the first user and the third user, or a relationship between the second user and the third user.

\* \* \* \* \*